United States Patent
Crosby

(10) Patent No.: US 6,745,127 B2
(45) Date of Patent: Jun. 1, 2004

(54) SYSTEM AND METHOD FOR TRACKING AND REPORTING PESTICIDE AND FERTILIZER USE ON AGRICULTURAL PRODUCTS

(76) Inventor: Howard M. Crosby, 1330 86th Ter. North, St. Petersburg, FL (US) 33702

( * ) Notice: Subject to any disclaimer, the term of this patent is extended or adjusted under 35 U.S.C. 154(b) by 0 days.

(21) Appl. No.: 10/327,530

(22) Filed: Dec. 21, 2002

(65) Prior Publication Data

US 2003/0130795 A1 Jul. 10, 2003

Related U.S. Application Data

(60) Provisional application No. 60/342,935, filed on Dec. 21, 2001.

(51) Int. Cl.$^7$ ............................................... G06F 19/00
(52) U.S. Cl. ........................................................ 702/2
(58) Field of Search .......................... 702/2, 5; 701/50

(56) References Cited

U.S. PATENT DOCUMENTS

| | | | |
|---|---|---|---|
| 5,845,229 A | * 12/1998 | Rawlins | 702/2 |
| 6,002,984 A | * 12/1999 | Aughenbaugh | 702/2 |
| 6,360,179 B1 | * 3/2002 | Reep | 702/104 |
| 6,385,544 B1 | * 5/2002 | Mafra-Neto | 702/5 |
| 2001/0044097 A1 | * 11/2001 | Kurumizawa | 434/225 |

* cited by examiner

Primary Examiner—Donald McElheny, Jr.
(74) Attorney, Agent, or Firm—Jeffrey C. Maynard

(57) ABSTRACT

A system by which consumers can determine the growth history of a produce crop including fertilizer application, chemical application, and processing. A grower records the history of application to the product in a database. Upon harvesting the crop, the history is transmitted to a central server, which is accessible to the public over the Internet. The central server assigns a unique identification to the crop. A consumer can access the central server information suing the unique identifier to determine the history of the produce. Central server information also facilitates recall when necessary and enhances security by providing complete accountability for the produce.

5 Claims, 2 Drawing Sheets

SYSTEM AND METHOD FOR TRACKING AND REPORTING PESTICIDE AND FERTILIZER USE ON AGRICULTURAL PRODUCTS

CROSS-REFERENCE TO RELATED APPLICATIONS

The present application is based upon and gains priority from U.S. Provisional Patent Application Ser. No. 60/342,935, filed Dec. 21, 2001 by the inventor herein and entitled "System and Method for Tracking and Reporting Pesticide and Fertilizer Use on Agricultural Products," the specification of which is incorporated herein by reference.

BACKGROUND OF THE INVENTION

1. Field of the Invention

The present invention relates to a system and method for tracking and reporting the use of chemicals in growing consumable agricultural products, and in particular, the invention relates to a system and method by which consumers of agricultural products can find and read the complete history of all treatment to agricultural products from the time such product was planted until it was harvested.

2. Background of the Prior Art

Federal regulations exist that require a grower to record all of the chemical applications that are performed on a given crop. Such regulations are designed to protect workers and others exposed to such chemical applications in the field. No effective method is known to exist to enable a consumer to determine the specific origin of particular produce, and to determine which produce has been treated with any chemical. Even such produce listed as "organic" may have been treated with some fertilizer, which is not reported to any consumer.

A need exists for a system that is intended to be used so that a consumer can obtain the complete history of chemical treatment to selected produce for purposes of making purchasing decisions. There is a need for a database, accessible by the consuming public, wherein special information can be obtained concerning selected product history. Furthermore, there is a need to provide a system that can be used by grocery purveyors, food processors and canneries to maintain more consistent product quality and reduce risk by avoiding producers not in compliance with prescribed standards.

SUMMARY OF THE INVENTION

The present invention fulfills these needs. A labeling and database management tool is provided to track produce from seed to serving.

It is, therefore, an object of the present invention to enable a food tracking system that avoids the disadvantages of the prior art.

Another object of the present invention is to enable consumers to learn the genetics of the seeds, the location of the farm, the fertilizers, the pesticides, and the packinghouse that handled the produce on their table.

It is a further object of the present invention to enable the Department of Homeland Security, the Food and Drug Administration and other national health agencies to instantly track the source of troublesome produce and efficiently recall if necessary.

Another object is to enable grocery purveyors, food processors and canneries to maintain quality that is more consistent and reduce risk by avoiding producers not in compliance with their standards and/or national regulations.

Another object is to motivate growers to comply with the laws protecting agricultural laborers from overexposure to harmful chemicals.

Another object is to increase efficiency of markets, up and down the food chain, by providing all participants more knowledge about the quantities and characteristics of the produce in the pipeline.

A further object of the present invention is to dovetail an identification code enabled by the present technology with uniform product codes (UPC) for checkout pricing thereby reducing the labor of preparing produce for shelving.

The various features of novelty that characterize the invention will be pointed out with particularity in the claims of this application.

BRIEF DESCRIPTION OF THE DRAWINGS

The above and other features, aspects, and advantages of the present invention are considered in more detail, in relation to the following description of embodiments thereof shown in the accompanying drawings, in which.

DETAILED DESCRIPTION OF THE INVENTION

The invention summarized above and defined by the enumerated claims may be better understood by referring to the following description, which should be read in conjunction with the accompanying drawings in which like reference numbers are used for like parts. This description of an embodiment, set out below to enable one to build and use an implementation of the invention, is not intended to limit the enumerated claims, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

The system comprises:
1) An application management software program for tracking chemical use on produce;
2) A server to correlate, retrieve and display the data;
3) A global computer network accessible to such server; and
4) Unique marking on produce labeling for identification of selected data.

In a preferred embodiment of the tracking and reporting system described herein, an accountability database is enabled to track and report the complete history of everything that has happened to a selected product, since it was planted, until it was harvested. Such information is made available to consumers around the clock should they wish to look at it. All that is needed to retrieve such information is a computer and access to a global computer network with access to such database. Stores could even provide a scanner with a display that would allow the consumer to view the product's history instantly.

Figure 1:
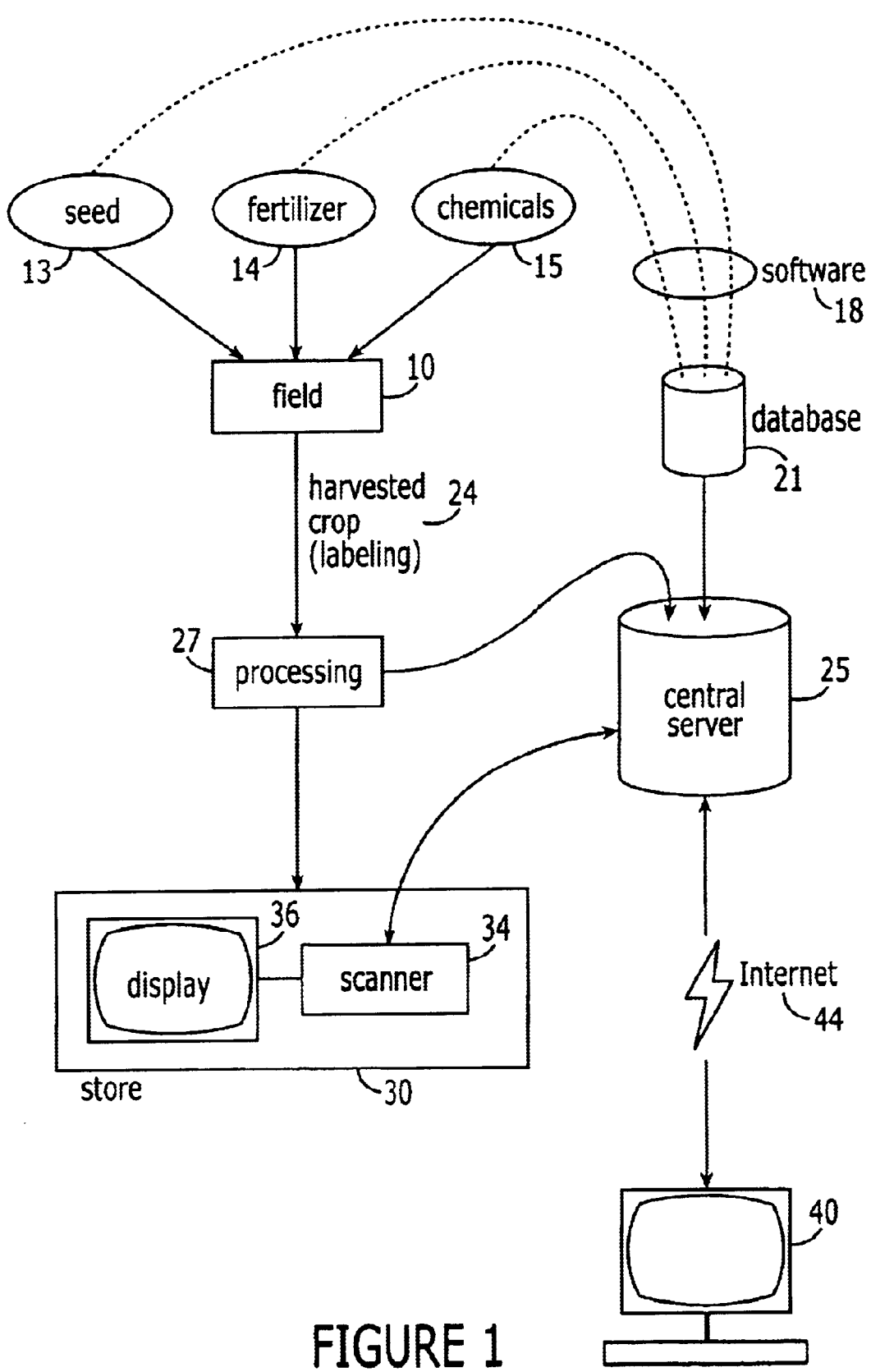
FIG. 1 is a block diagram of a system according to the present invention.

Referring to FIG. 1, a grower may use a field 10 to grow a consumable crop. The grower may plant seeds 13 in the field 10 and apply fertilizer 14 and other chemicals 15, such as pesticides. The grower can use a software program 18 to record information concerning the growing crop in a database 21.

What information does such database 21 contain? It contains the name of the farm, the names of the applicators and workers, each time the field was fertilized, the type of fertilizer 14 used and the amount of fertilizer applied, each time a chemical application 15 was performed and the type and quantity of chemical used. In other words, it is an accountability record.

When the crop is harvested 24, the grower transmits the history of application to a central server 25. The central server 25 assigns a unique identification number to that field/crop.

The identification number identifies the produce for which such information is available. The identification accompanies the product to market and may be affixed on a label, which may also include a bar code or other type of computer scanable or readable code. The label may also comprise a specialized symbol. By observing such specialized symbol, a consumer knows that the grower performed all activity according to Federal and State regulations concerning the referenced produce.

The crop may undergo additional processing 27, such as canning or other preparation. Such additional processing information concerning the processing plant, date of processing, and possible additional additives is added to the information in the central server.

After processing, if any, is complete, the product is shipped to a purveyor 30, such as a grocery store. A potential purchaser of the product can determine the history of the product by using a scanner 34 placed in the produce section of the store. The scanner 34 would be in communication with the central server and display the product history on a store display screen 36. Information displayed may include the entire growing and processing history or a certificate is of authenticity and the like. In an alternate embodiment, display 36 may also include information concerning the product, such as related product, handling and storing instructions, and even recipes.

In an additional feature of the present invention, information in the central server 25 may be accessible by a consumer using a personal computer 40 in communication with the Internet 44 to access the central server 25.

Figure 2:
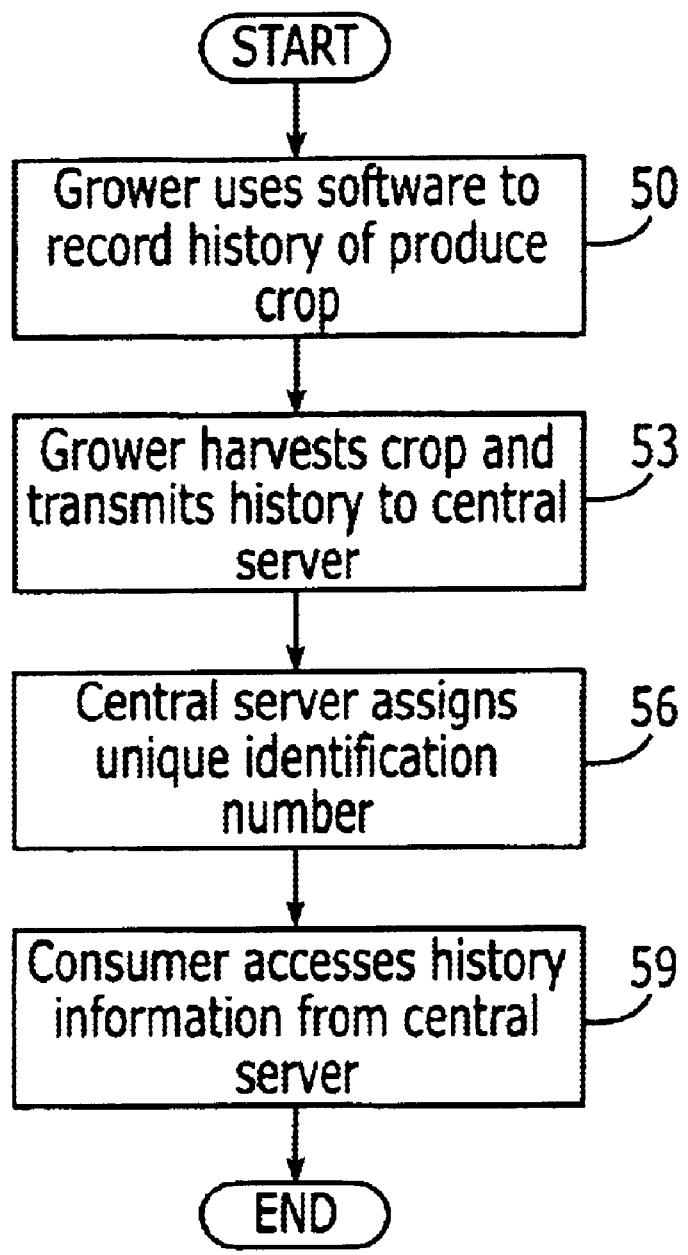
FIG. 2 is a flowchart of a methodology incorporating the present invention.

Referring now to FIG. 2, a method for incorporating the present invention is illustrated. The first step, at station 50, a grower uses a record-keeping software to record a history of everything that occurs to the product while it is growing.

The next step, at station 53, the grower harvests the product and transmits the history to a central server. The central server assigns a unique number to the product, station 56. The unique number accompanies the product through processing, if any, to market.

At station 59, a consumer can access the information is the central server via the Internet or by scanning a label attached to the produce. The consumer will know, when they observe the label, that complete accountability of the product is available.

In a preferred embodiment, each crop is assigned an identification code and everything that happens to that crop from seed planting to packinghouse will be recorded in a database that is accessible by the public.

With 24/7 Internet access, consumers could know the genetics of the seeds, the location of the farm, the fertilizers, the pesticides, and the packinghouse that handled the produce on their table.

The Department of Homeland Security, the Food and Drug Administration and other health agencies could instantly track the source of troublesome produce and efficiently recall if necessary.

Grocery purveyors, processors and canneries could maintain quality that is more consistent and reduce risk by avoiding producers not in compliance with their standards.

Growers would be motivated to comply with the laws protecting agricultural labors from harmful chemicals.

Markets up and down the food chain would be more efficient as all participants would have more knowledge about the quantities and characteristics of the produce in the pipeline.

As the Identification code would dovetail with UPC for checkout pricing Produce Purveyors would reduce the labor of preparing the produce for shelving There is a Federal Law that requires a grower to record all of the chemical applications that are performed on a given crop. The system described herein is an extension of such record made available to the public. By providing a coordinated database and means for accessing such database, produce that has been identified as recorded in such database can be reviewed by consumers while making purchasing decisions.

Consumers are interested in obtaining such information. This can be illustrated, in the arena of food products, by the growth of "organic produce". At the present time, "organics" have a small market share; however, more and more people are willing to pay very high prices for "organic" products. With the reality of biological terrorism, as illustrated with recent Anthrax scares, more and more people are starting to think about what they buy. Now, more than ever, people want security. Selected produce labeled according to the present invention will fill part of that void.

A label displaying a specialized symbol identifies produce having information in such database. Each crop is assigned a unique identifier, such as a number or alphanumeric combination for location in such database. A consumer can access the database and determine the growth history of any produce bearing such unique identifier.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention has been described with references to a preferred embodiment. While specific values, relationships, materials and steps have been set forth for purposes of describing concepts of the invention, it will be appreciated by persons skilled in the art that numerous variations and/or modifications may be made to the invention as shown in the specific embodiments without departing from the spirit or scope of the basic concepts and operating principles of the invention as broadly described. It should be recognized that, in the light of the above teachings, those skilled in the art can modify those specifics without departing from the invention taught herein. Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is intended to include all such modifications, alternatives and other embodiments insofar as they come within the scope of the appended claims or equivalents thereof. It should be understood, therefore, that the invention may be practiced otherwise than as specifically set forth herein. Consequently, the present embodiments are to be considered in all respects as illustrative and not restrictive.

What is claimed is:

1. A system for tracking and reporting fertilizer and chemical use on agricultural products from a pre-defined piece of land, comprising:

a software program operating in conjunction with a database for storing a history of such fertilizer and chemical, wherein such history includes at least one of
a) planting information;
b) growing information;
c) harvesting information;
d) chemical application information; and
e) weather information;

a central server that receives such history of such fertilizer and chemical use from such database once such agricultural product is harvested, wherein such central server assigns a unique identifier to such product associated with such history;

label means for such agricultural product, wherein such unique identifier is included on such label for marking such agricultural product with such unique identifier that relates to such history; and means for a retail consumer to access such history information in such central server using such unique identifier.

2. The system of claim 1, wherein such central server is in communication with a global computer network.

3. The system of claim 2, wherein such global computer network comprises the Internet.

4. The system of claim 1, such label means further comprising: a unique product symbol indicating such agricultural products for which such history information is available.

5. A method for tracking and reporting fertilizer and chemical use on agricultural products from a pre-defined piece of land, such method comprising:

furnishing a produce grower with a software program that enables record-keeping of seed application and application of other substances to a field in which such seed is planted;

recording in a database a history of everything that occurs to a product while it is growing, wherein such history includes at least one of
a) planting information;
b) growing information;
c) harvesting information;
d) chemical application information; and
e) weather information;

upon harvesting such product, transmitting such history to a central server;

such central server assigning a unique identifier to such harvested product;

labeling such product with such unique identifier, such label accompanying such product to market; and enabling a retail consumer to access such history in such central server using such unique identifier from such label.

* * * * *